W. S. HOLMES & W. B. JOHNSON.
CUSHION TIRE FOR VEHICLES.
APPLICATION FILED FEB. 18, 1910.

1,027,130.

Patented May 21, 1912.

2 SHEETS—SHEET 1.

Witnesses

Inventors
Wesley S. Holmes
Welcome B. Johnson
By Meyers, Cushman & Rea
Attorney

W. S. HOLMES & W. B. JOHNSON.
CUSHION TIRE FOR VEHICLES.
APPLICATION FILED FEB. 18, 1910.
1,027,130.
Patented May 21, 1912.
2 SHEETS—SHEET 2.
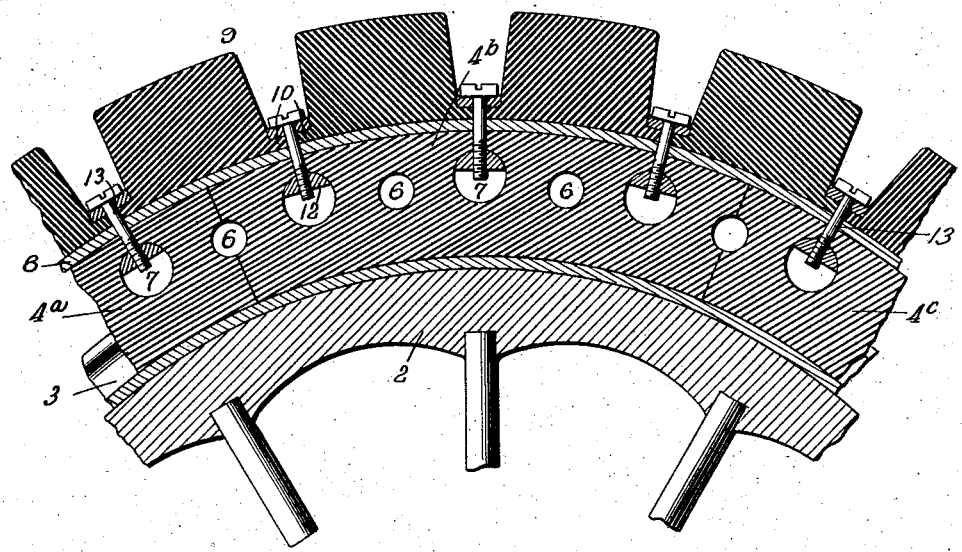
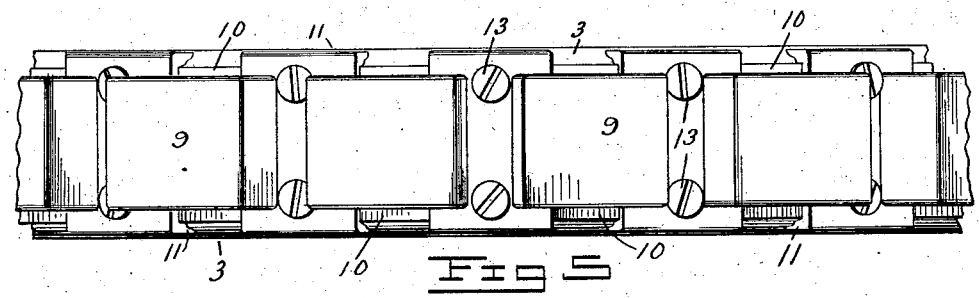
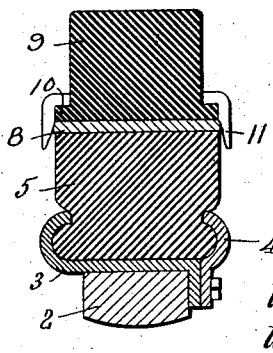
Inventors
Wesley S. Holmes
Welcome B. Johnson.

UNITED STATES PATENT OFFICE.

WESLEY S. HOLMES, OF ITHACA, AND WELCOME B. JOHNSON, OF NEW YORK, N. Y., ASSIGNORS TO AUGUST ZINSSER, JR., TRUSTEE, OF NEW YORK, N. Y.

CUSHION-TIRE FOR VEHICLES.

1,027,130.   Specification of Letters Patent.   Patented May 21, 1912.

Application filed February 18, 1910. Serial No. 544,601.

*To all whom it may concern:*

Be it known that we, WESLEY S. HOLMES and WELCOME B. JOHNSON, citizens of the United States, residing at Ithaca and New York, respectively, in the counties of Tompkins and New York, respectively, and State of New York, have invented new and useful Improvements in Cushion-Tires for Vehicles, of which the following is a specification.

This invention relates to improvements in tires for vehicle wheels designed chiefly for automobiles, and has for its object to provide a cushion tire possessing the requisite elasticity, capable of completely compensating for the various strains to which the vehicle wheel and the tire thereof are subject in use, and assume a normal condition and position after relieved of such strains and whereby the strain is distributed throughout a considerable area of the tire.

The invention has for its further object to provide such cushion tire in combination with means whereby tread surfaces of different types may be readily assembled in combination with the cushion element of the tire.

That which is regarded as new will be hereinafter set forth and pointed out in the claim.

In the accompanying drawings we have illustrated two forms of embodiment of the invention, but desire it understood that such forms are not exclusive.

Figure 1:
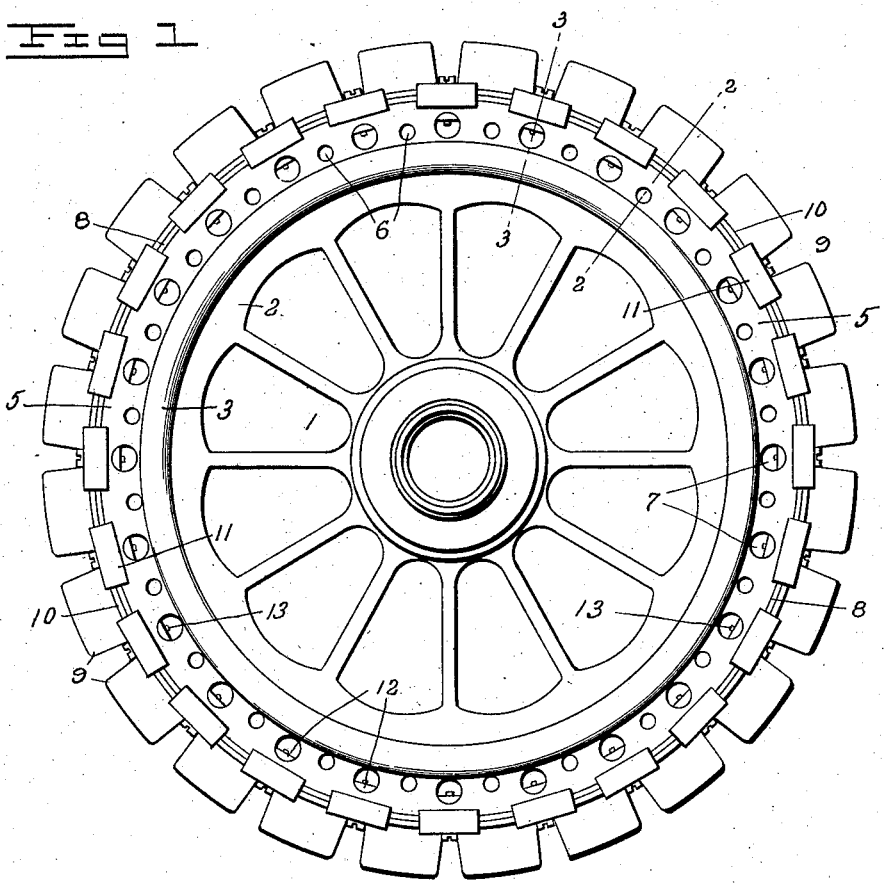
Figure 2:
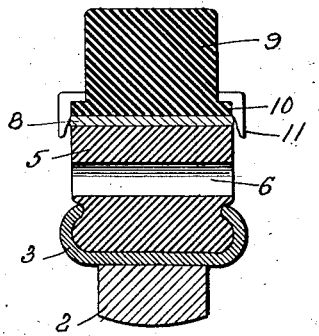
Figure 3:
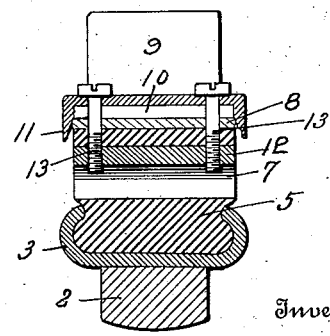

Figure 1 is an elevation of an organized wheel provided with one form of tire embodying the invention. Fig. 2 is a sectional view on the line 2—2 of Fig. 1; Fig. 3 is a similar view on the line 3—3 of Fig. 1; Fig. 4 is an enlarged detail elevation; Fig. 5 is a detail, plan view; Fig. 6 is a sectional view illustrating the invention as embodied with a clencher rim, one tire engaging flange of which is removable to facilitate quick mounting and demounting of the tire.

In the said drawings, the reference numeral 1 designates a vehicle wheel about the felly 2 of which is fitted annular tire-securing means. This annular tire-securing means engages the cushion element of the tire at its base contiguous to the felly. The cushion element is left perfectly free to compensate not only for radial but tangential or longitudinal pressure and to assume its normal condition when released from such pressure.

In use tires are subject to radial pressure and also to a tangential pressure calculated to cause the tire to creep. The cushion element of our invention is so combined and held in place that it will respond to or compensate for such pressures and assume its normal position when relieved thereof.

We have shown tire-securing means 3 of the clencher-rim type, and in Fig. 6 of the drawing have illustrated one flange 4 of this clencher rim as removably connected to the tire bed thereof to facilitate the mounting and demounting of the tire. We wish it understood, however, the invention is not limited to this type of tire-securing means, as any suitable means for securing the tire, leaving the cushion element free to respond to or compensate for the pressures or stresses referred to, may be employed.

The cushion element 5 is of rubber of any desired degree of elasticity, and the elasticity thereof is preferably augmented by transverse perforations 6; and this elasticity may also be augmented in the form of invention shown in Figs. 1-6, by the transverse perforations 7 which play a part, in that form, in uniting together the tread or shoe and cushion elements of the tire, as will be hereinafter explained. The cushion element 5 of the tire may consist of a single annular ring of rubber or may be made in sections as indicated in Fig. 4 where the numerals 4ª, 4ᵇ and 4ᶜ designate adjoining or contiguous sections. Preferably the cushion element will consist of a single annular ring of rubber the periphery of which is a cylindrical surface.

Surrounding the cushion element of the tire is an endless flexible or springy band of metal 8, preferably of hammered spring steel, flat transversely, and closely embracing the cushion element, which serves not only as a strengthening member for the tire as a whole, but to distribute the shock and the bounding action to which the wheel is subjected when running at high speed. Outside of the pressure distributing band is the tread 9 of the tire which is shown in Figs. 1-6 as composed of a series of individual blocks of rubber, each provided with a continuous surrounding base flange 10. Interposed between the several blocks of the tread member of the tire are eye-shaped clencher plates, the stems of which engage the contiguous or adjacent portions of the base flange of the several blocks of the tread of the tire. The head portions or lateral extensions of these clencher plates fit over the opposite side portions of the base flanges 10 referred to, and have depending arms 11 that embrace the opposite faces of the cushion element of the tire and thus serve to hold the elements of the tire from lateral displacement. Combined with these clencher plates are anchors 12 disposed within the transverse perforations 7 of the cushion element and through coincident openings in said clencher plates bolts 13 pass, the ends of said bolts being screw-threaded and the openings in the anchors being correspondingly screw-threaded. When the bolts are in place the several elements of the tire are firmly connected together against liability of longitudinal, lateral or radial displacement. By preference, the several parts are secured together by the utilization of two bolts to each clencher plate and associated elements, disposed toward the opposite ends of the clencher plates.

It will be observed that the elements by which the cushion and tread portions of the tire are united leave the cushion element of the tire perfectly free to respond to or compensate for the various strains to which such wheels are subjected in use and as above explained.

The tire is an exceedingly strong and secure one; has an elasticity comparable with that of pneumatic tires; is free of all hindrances to its complete response to the various strains to which such tires are subjected in use and immediate assumption of normal position and condition when relieved of such strains, and by reason of the strain distributing band interposed between the cushion and tread or shoe elements is not subject to abrupt depression at the immediate point of strain, but the action under such strain is distributed through a considerable area of the tire, thus avoiding a continual local disturbance and distortion of the elements of the tire.

Having thus described the invention, what is claimed is:—

A vehicle tire comprising an annular cushion element the periphery of which is a continuous cylindrical surface, a surrounding flexible distributing band of spring metal in continuous contact with said cushion element, an outer tread or shoe comprising a plurality of independent resilient blocks each having an encircling flange and bearing on said band, a clamping plate extending transversely between each pair of blocks and having lateral extensions on each end, said plates and their extensions bearing on the encircling flanges of said blocks, radial means for fastening said plates to the band and to the cushion element, and means for securing the cushion element to the wheel.

In testimony whereof we have hereunto set our hands in presence of two subscribing witnesses.

WESLEY S. HOLMES.
WELCOME B. JOHNSON.

Witnesses for Wesley S. Holmes:
   M. E. HOLMES,
   E. N. JACKSON.
Witnesses for Welcome B. Johnson:
   CHARLES D. SWORD,
   AUG. ZINSSER.

---

Copies of this patent may be obtained for five cents each, by addressing the "Commissioner of Patents, Washington, D. C."